United States Patent
Do et al.

(10) Patent No.: US 9,664,592 B2
(45) Date of Patent: May 30, 2017

(54) PLANETARY GEAR CARRIER PACK TRANSMISSION ERROR INSPECTION DEVICE

(71) Applicants: Hyundai Motor Company, Seoul (KR); Psylogic, Inc., Yongin, Gyeonggi-do (KR)

(72) Inventors: Jong Gu Do, Daegu (KR); Hyun Ku Lee, Seoul (KR); Tae Hwi Lee, Gyeonggi-do (KR)

(73) Assignees: Hyundai Motor Company, Seoul (KR); Psylogic, inc., Yongin (KR)

( * ) Notice: Subject to any disclaimer, the term of this patent is extended or adjusted under 35 U.S.C. 154(b) by 318 days.

(21) Appl. No.: 14/293,318

(22) Filed: Jun. 2, 2014

(65) Prior Publication Data
US 2015/0192496 A1    Jul. 9, 2015

(30) Foreign Application Priority Data
Jan. 6, 2014    (KR) .................. 10-2014-0001395

(51) Int. Cl.
*G01M 13/02*    (2006.01)

(52) U.S. Cl.
CPC .......... *G01M 13/021* (2013.01); *G01M 13/02* (2013.01); *G01M 13/026* (2013.01); *G01M 13/028* (2013.01)

(58) Field of Classification Search
CPC ... G01M 13/02; G01M 13/026; G01M 13/028
USPC ........................................................ 73/162
See application file for complete search history.

(56) References Cited

U.S. PATENT DOCUMENTS

| | | | | |
|---|---|---|---|---|
| 1,909,088 A | * | 5/1933 | Bauer | G01M 13/021 33/501.13 |
| 3,680,373 A | * | 8/1972 | Kearfott | G01M 13/021 73/162 |
| 2003/0167143 A1 | * | 9/2003 | Turbett | G01M 13/021 702/113 |
| 2006/0264298 A1 | | 11/2006 | Trush et al. | |
| 2012/0053000 A1 | * | 3/2012 | Ohm | F16H 3/54 475/149 |

FOREIGN PATENT DOCUMENTS

| | | |
|---|---|---|
| JP | 2007-040787 A | 2/2007 |
| KR | 10-2009-0127169 A | 12/2009 |
| KR | 10-2010-0102350 A | 9/2010 |

* cited by examiner

*Primary Examiner* — David M Gray
*Assistant Examiner* — Andrew V Do
(74) *Attorney, Agent, or Firm* — Mintz Levin Cohn Ferris Glovsky and Popeo, P.C.; Peter F. Corless

(57) ABSTRACT

A planetary gear carrier pack transmission error inspection device is provided. The device includes a planetary gear carrier pack that outputs a rotation speed input to an input side through a planetary gear, a sun gear and a ring gear at a predetermined gear ratio to an output side. An input unit is arranged on an upper side of the planetary gear carrier pack to input a predetermined input rotation speed to the input side of the planetary gear carrier pack. A load unit is arranged on a lower side of the planetary gear carrier pack connected to the output side of the planetary gear carrier pack to apply a predetermined output load to the output side. In addition, an adjusting block is arranged to adjust the planetary gear carrier pack to secure the planetary gear carrier pack.

8 Claims, 6 Drawing Sheets

PLANETARY GEAR CARRIER PACK TRANSMISSION ERROR INSPECTION DEVICE

CROSS-REFERENCE TO RELATED APPLICATION

This application claims priority to and the benefit of Korean Patent Application No. 10-2014-0001395 filed in the Korean Intellectual Property Office on Jan. 6, 2014, the entire contents of which are incorporated herein by reference.

BACKGROUND (a) Field of the Invention

The present invention relates to a planetary gear carrier pack transmission error inspection device for inputting a torque to a sun gear side, and applying a load to a carrier side while outputting a torque thereto to measure a transmission error between an input side and an output side.

(b) Description of the Related Art

In general, as a reduction gear used for reducing a speed in a machine, a reduction gear of the planetary gear or the like is used. Particularly, to obtain a substantial speed reduction ratio, the reduction gear of the planetary gear is often used. In the reduction gear of the planetary gear, there may be a substantially simple planetary gear reduction gear having one planetary gear set, and a complex planetary gear reduction gear having two or more complex planetary gear sets.

Equipment for testing efficiency of the planetary gear set is provided with a drive unit A and an output unit B for inputting rotation to test a large capacity planetary gear box. In addition, when a rotation axis of the planetary gear box is arranged in a horizontal direction, since the rotation shaft sags by gravity of the gear, it may be difficult to accurately inspect the planetary gear set. Further, when it is intended to inspect an input and an output when the planetary gear box is mounted to a transmission, there has been inconvenience in removal of the planetary gear box from the transmission when an error occurs.

The above information disclosed in this section is merely for enhancement of understanding of the background of the invention and therefore it may contain information that does not form the prior art that is already known in this country to a person of ordinary skill in the art.

SUMMARY

An object of the present invention is to provide a planetary gear carrier pack transmission error inspection device in which sagging of a rotation center shaft by gravity is prevented for more accurate measurement of an input and an output, and an environment is provided, in which a planetary gear carrier pack is mounted to a transmission by applying a load to an output side when the planetary gear pack is not mounted to the transmission to reduce an assembly cost and simplified measuring of the input/output errors.

In an exemplary embodiment of the present invention, a planetary gear carrier pack transmission error inspection device may include a planetary gear carrier pack configured to output a rotation speed input to an input side via a planetary gear, a sun gear and a ring gear at a predetermined gear ratio to an output side, an input unit arranged on an upper side of the planetary gear carrier pack configured to input a predetermined input rotation speed to the input side of the planetary gear carrier pack, a load unit arranged on a lower side of the planetary gear carrier pack connected to the output side of the planetary gear carrier pack configured to apply a predetermined output load to the output side, and an adjusting block arranged to adjust the planetary gear carrier pack to secure the planetary gear carrier pack.

The device may further include an output side encoder and an input side encoder configured to sense a rotation speed output to the output side and a rotation speed of the input side of the input unit, and a controller configured to operate the input unit and the load unit to input a predetermined speed to the input side and to input a predetermined load to the output side to output a state signal of the planetary gear carrier pack using rotation speed signals of the input side and the output side sensed by the input side encoder and the output side encoder.

The input unit may include an input servomotor configured to generate a predetermined torque and rotation speed, an input spindle fastened to the input side for transmission of the torque and the rotation speed from the servomotor to the input side, and a rear sun gear arranged at an end portion of the input spindle for transmission of the torque to an input side planetary gear. The load unit may include an output spindle arranged from a lower side to an upper side rotatably fastened to the output side, and a load servomotor configured to apply a predetermined load to the output spindle. The output side may be a front carrier extended to a lower side of the planetary gear carrier pack.

Additionally, the load unit may include a front sun gear securing shaft arranged extended from a lower side to an upper side to secure the front sun gear projected from a substantially center portion to a lower side of the front carrier, and a guide shaft inserted from a lower side to an upper side of a substantially center portion of the front sun gear securing shaft by a predetermined distance. The input servomotor and the input spindle may transmit rotation with a belt and a pulley, and the output spindle and the load servomotor may transmit rotation with a belt and a pulley. The input unit may be arranged on the upper side to be movable vertically with a linear guide. The load unit may be arranged on the lower side secured in a vertical direction.

The device may further include a lift unit configured to move the input unit vertically, wherein the lift unit may include a lead screw arranged rotatably, and a slider arranged to move vertically based on the rotation of the lead screw. The device may further include a frame configured to secure the input side and the output side of the planetary gear carrier pack to be arranged in a vertical direction.

In an exemplary embodiment of the present invention, the sensing of the rotation of the input side and the output side with encoders respectively when the rotation axis of the planetary gear carrier pack is arranged vertically, the problem of sagging of the gear shaft may be prevented. Moreover, by applying the load to the output side when the planetary gear carrier pack is not mounted to the transmission, an environment may be realized, in which the planetary gear carrier pack is mounted to the transmission, to reduce an assembly cost.

DETAILED DESCRIPTION

Figure 1A:
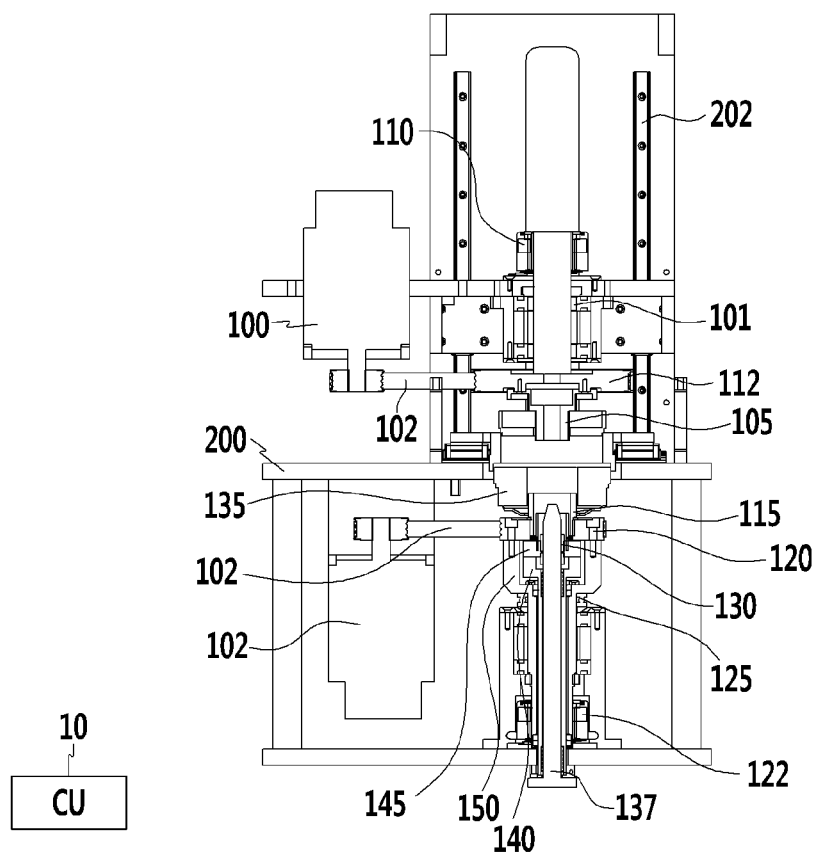
FIG. 1A illustrates an exemplary cross-sectional view of a planetary gear carrier pack transmission error inspection device in accordance with an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

An exemplary embodiment of the present invention will hereinafter be described in detail with reference to the accompanying drawings. The planetary gear carrier pack transmission error inspection device in accordance with an exemplary embodiment of the present invention, for inspecting a planetary gear carrier pack 135 before the planetary gear carrier pack 135 is mounted to a transmission, may reduce an assembly time period of the transmission and overall defects.

By inputting a torque of predetermined speed to an input side and applying a predetermined load to an output side, an operation environment in which the planetary gear carrier pack is mounted to the transmission may be constructed. Then, a difference of rotation speeds between the input side and the output side may be calculated with an input side encoder 110 and an output side encoder 122, the difference of speeds may be integrated to measure a transmission error, and the transmission error may be isolated using an RSA method. Moreover, stable testing of the planetary gear carrier pack 135 may be difficult due to sag of a gear shaft by gravity when the input side and the output side are arranged on the same rotation axis to dispose the rotation shaft, horizontally. In an exemplary embodiment of the present invention, the rotation shaft of the planetary gear carrier pack may be arranged vertically to prevent the gear shaft from sagging.

Figure 4:
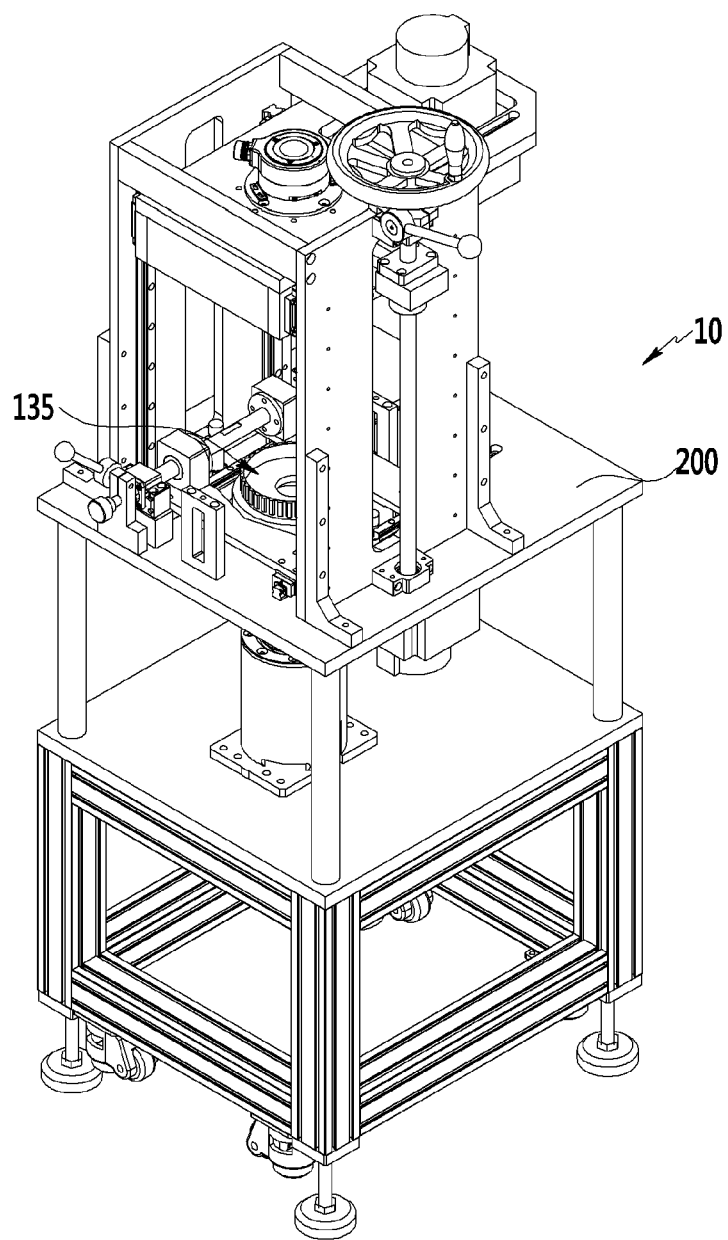
FIG. 4 illustrates an exemplary view of a planetary gear carrier pack transmission error inspection device in accordance with an exemplary embodiment of the present invention.
Figure 5:
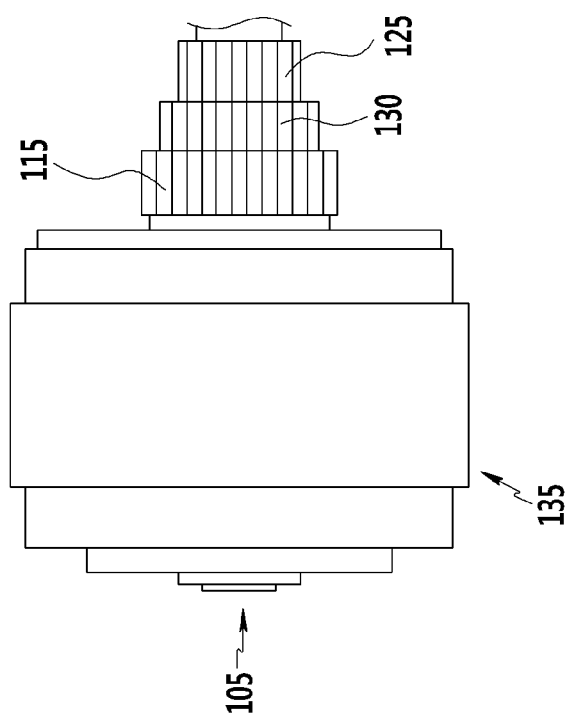
FIG. 5 illustrates an exemplary partial side view of a planetary gear carrier pack transmission error inspection device in accordance with an exemplary embodiment of the present invention.

FIG. 4 illustrates an exemplary view of a whole planetary gear carrier pack transmission error inspection device in accordance with an exemplary embodiment of the present invention, and FIG. 5 illustrates an exemplary side view of a planetary gear carrier pack transmission error inspection device in accordance with an exemplary embodiment of the present invention.

Referring to FIG. 5, the planetary gear carrier pack 135 may include non-illustrated sun gear, planetary gear and ring gear, a rear sun gear 105 (See FIG. 1A) which is an input side and a front carrier 115 which is an output side, a front sun gear 130 extended along a center axis in a center portion of the front carrier 115, and a middle sun gear 125. In an exemplary embodiment of the present invention, a torque input via the rear sun gear 105 in the inspection device may output to a front carrier 115 side via the planetary gear, the ring gear and the carrier in the carrier pack, the front sun gear 130 may be secured by a front sun gear securing shaft 140 (See FIG. 1A) and a securing ring 145 (See FIG. 1A), and the middle sun gear 125 may remain unfastened. Referring to FIG. 4, the planetary gear carrier pack transmission error inspection device may include a frame 200 arranged vertically, with the planetary gear carrier pack 135 secured to middle of the frame 200.

Figure 1B:
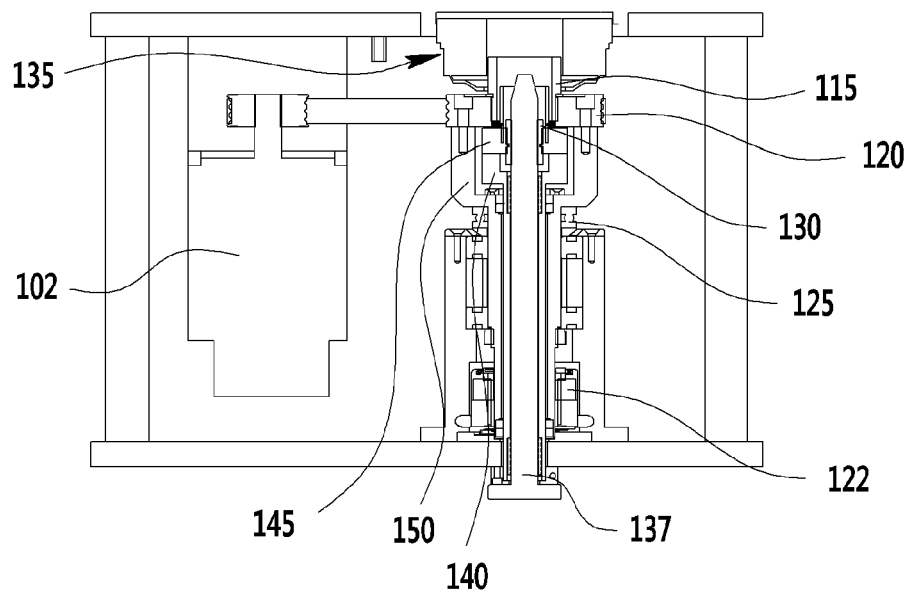
FIG. 1B illustrates an exemplary partial cross-sectional view of a planetary gear carrier pack transmission error inspection device in accordance with an exemplary embodiment of the present invention.

FIG. 1A illustrates an exemplary cross-sectional view of a whole planetary gear carrier pack transmission error inspection device in accordance with an exemplary embodiment of the present invention, and FIG. 1B illustrates an exemplary partial cross-sectional view of a planetary gear carrier pack transmission error inspection device in accordance with an exemplary embodiment of the present invention. Referring to FIGS. 1A and 1B, the planetary gear carrier pack transmission error inspection device may include the frame 200, an input unit, the planetary gear carrier pack 135, and a load unit.

The input unit, arranged to an upper side of the frame 200 with reference to the planetary gear carrier pack 135, may include an input servomotor 100, an input spindle 101, an input side encoder 110, a belt 103, an input pulley 112, the rear sun gear 105, and a linear guide 202. The input servomotor 100 may be configured to generate a torque and a rotation speed, the belt 103 may be configured to transmit rotation of the input servomotor 100 to the input pulley 112, and the input pulley 112 may be configured to rotate the input spindle 101. The input spindle 101 may have a rear sun gear 105 mounted to a lower end of the input spindle 101, and the input unit may have a structure in which the input unit moves vertically guided by the linear guide 202. Additionally, the input unit may have a structure in which, as the input spindle 101 rotates, the rear sun gear 105 rotates. The input side encoder 110 may be configured to measure rotation speeds of the input spindle 101 and the rear sun gear 105, and transmit signals of the measurement to a controller 10.

The load unit may be disposed on a lower side of the frame 200 with reference to the planetary gear carrier pack 135, and may include an output pulley 120 fastened to a front carrier 115, a load servomotor 102, a belt 103, an output spindle 150, a front sun gear securing shaft 140, a securing ring 145, a guide shaft 137, and an output encoder 122. The output pulley 120 may be fastened to the front carrier 115 of the planetary gear carrier pack 135, and the output spindle 150 may be extended to a lower side of the output pulley 120. Therefore, the load unit may have a structure in which the output spindle 150, the output pulley 120, the belt 103 and the load servomotor 102 may rotate together.

In an exemplary embodiment of the present invention, the load servomotor 102 may be configured to output a predetermined load and apply the load to the front carrier 115 which is an output side of the planetary gear carrier pack 135 in a direction opposite to an outputted rotation direction. The output spindle 150 may be a hollow pipe arranged in a vertical direction, and the front sun gear securing shaft 140 may be arranged in the output spindle 150 vertically, and the securing ring 145 may be arranged secured to a top side end of the front sun gear securing shaft 140. The front sun gear securing shaft 140 and the securing ring 145 may fixedly secure the front sun gear 130 of the planetary gear carrier pack 135. The front sun gear securing shaft 140 may be a hollow pipe arranged vertically, and the guide shaft 137 may be arranged vertically through the pipe space in the substantially center portion of the front sun gear securing shaft 140. The guide shaft may have a structure in which the guide shaft is inserted by a predetermined distance to an inside of the aperture formed in a substantially center portion of the middle sun gear of the planetary gear carrier pack. Therefore, when the planetary gear carrier pack 135 is fastened to the load unit of the frame 200, since a pointed top side portion of the guide shaft 137 is inserted in the middle sun gear 125, mounting work may be simplified.

Figure 2:
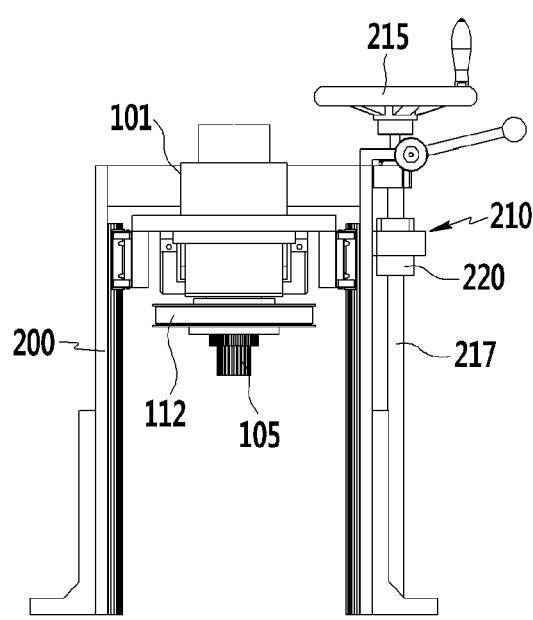
FIG. 2 illustrates an exemplary partial side view of a planetary gear carrier pack transmission error inspection device in accordance with an exemplary embodiment of the present invention.
Figure 3:
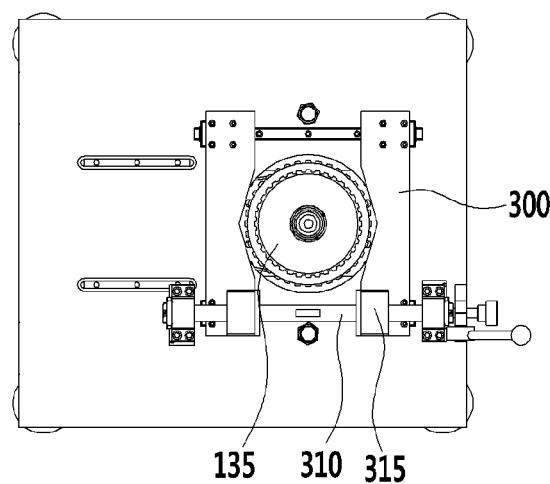
FIG. 3 illustrates an exemplary partial view of a planetary gear carrier pack transmission error inspection device in accordance with an exemplary embodiment of the present invention.

FIG. 2 illustrates an exemplary partial side view of a planetary gear carrier pack transmission error inspection device in accordance with an exemplary embodiment of the present invention, and FIG. 3 illustrates an exemplary partial plan view of a planetary gear carrier pack transmission error inspection device in accordance with an exemplary embodiment of the present invention. Referring to FIG. 3, the planetary gear carrier pack 135 may be fastened to the load unit, and an adjusting block 300 mounted to the frame 200 may secure opposite sides of the planetary gear carrier pack 135.

As a securing slider 315 moves, which may be moved by rotation of a securing lead screw 310, and the adjusting block 300 moves in a horizontal direction on the frame 200 by the securing slider 315, the planetary gear carrier pack 135 may be secured to the frame 200. Referring to FIG. 2, a lift unit 210 may be arranged on one side of an upper side of the frame 200, and the lift unit 210 may include the linear guide 202 (See FIG. 1A), a lead screw 217, a slider 220, and a lift handle 215. The lift unit 210 may have a structure in which the lead screw 217 rotates as the lift handle 215 is rotated, and the slider 220 may move vertically by the rotation of the lead screw 217 to move the input unit which may include the input spindle 101, the input pulley 112, and the rear sun gear 105 vertically along the linear guide 202 by the vertical movement of the slider 220.

In an exemplary embodiment of the present invention, since the controller may execute a program or a series of orders for operating a whole planetary gear carrier pack transmission error inspection device and various controllable elements, functions and advantages in accordance with an exemplary embodiment of the present invention may be achieved.

While this invention has been described in connection with what is presently considered to be exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

10: control unit
100: input servomotor
101: input spindle
102: load servomotor
103: belt
105: rear sun gear
110: input side encoder
115: front carrier
120: output pulley
122: output side encoder
125: middle sun gear
130: front sun gear
135: planetary gear carrier pack
137: guide shaft
140: front sun gear securing shaft
145: securing ring
150: output spindle
200: frame
202: linear guide
210: lift unit
215: lift handle
217: lead screw
220: slider
300: adjusting block
310: securing lead screw
315: securing slider

What is claimed is:
1. A planetary gear carrier pack transmission error inspection device, comprising:
 a planetary gear carrier pack configured to output a rotation speed input to an input side via a plurality of gears at a predetermined gear ratio to an output side;
 an input unit arranged on an upper side of the planetary gear carrier pack and configured to input a predetermined input rotation speed to the input side of the planetary gear carrier pack;
 a load unit arranged on a lower side of the planetary gear carrier pack connected to the output side of the planetary gear carrier pack and configured to apply a predetermined output load to the output side;
 an adjusting block arranged to adjust the planetary gear carrier pack to secure the planetary gear carrier pack;

an output side encoder and an input side encoder configured to sense a rotation speed output to the output side and a rotation speed of the input side of the input unit; and a controller configured to operate the input unit and the load unit to input a predetermined speed to the input side and to input a predetermined load to the output side to output a state signal of the planetary gear carrier pack using rotation speed signals of the input side and the output side sensed by the input side encoder and the output side encoder, wherein the output side is a front carrier extended to a lower side of the planetary gear carrier pack, and wherein the load unit includes:
 a front sun gear securing shaft that extends from a lower side to an upper side to secure the front sun gear projected from a substantially center portion to a lower side of the front carrier, and
 a guide shaft inserted from a lower side to an upper side of a substantially center portion of the front sun gear securing shaft by a predetermined distance.

2. The device of claim 1, wherein the input unit includes:
an input servomotor configured to generate predetermined torque and rotation speed,
an input spindle fastened to the input side for transmission of the torque and the rotation speed from the servomotor to the input side, and
a rear sun gear arranged at an end portion of the input spindle for transmission of the torque to an input side planetary gear.

3. The device of claim 1, wherein the load unit includes:
an output spindle arranged from a lower side to an upper side rotatably fastened to the output side, and
a load servomotor configured to apply a predetermined load to the output spindle.

4. The device of claim 3, wherein
the input servomotor and an input spindle are configured to transmit rotation with a belt and a pulley, and
the output spindle and the load servomotor are configured to transmit rotation with a belt and a pulley.

5. The device of claim 1, wherein the input unit is arranged on the upper side to be movable vertically with a linear guide.

6. The device of claim 5, wherein the load unit is arranged on the lower side secured in a vertical direction.

7. The device of claim 5, further comprising:
a lift unit configured to vertically move the input unit,
wherein the lift unit includes;
 a lead screw arranged rotatably, and
 a slider arranged to move vertically based on the rotation of the lead screw.

8. The device of claim 1, further comprising
a frame configured to secure the input side and the output side of the planetary gear carrier pack to be arranged in a vertical direction.

* * * * *